US012521493B2

(12) United States Patent
Calderwood et al.

(10) Patent No.: US 12,521,493 B2
(45) Date of Patent: Jan. 13, 2026

(54) DRIVE ASSEMBLY FOR A MEDICAMENT DELIVERY DEVICE

(71) Applicant: SHL MEDICAL AG, Zug (CH)

(72) Inventors: Gary Calderwood, Stockholm (SE); Björn Krohn, Arsta (SE); Joakim Lindholm, Saltsjo-Boo (SE)

(73) Assignee: SHL Medical AG, Zug (CH)

( * ) Notice: Subject to any disclaimer, the term of this patent is extended or adjusted under 35 U.S.C. 154(b) by 923 days.

(21) Appl. No.: 17/774,934

(22) PCT Filed: Nov. 12, 2020

(86) PCT No.: PCT/EP2020/081838
§ 371 (c)(1),
(2) Date: May 6, 2022

(87) PCT Pub. No.: WO2021/104885
PCT Pub. Date: Jun. 3, 2021

(65) Prior Publication Data
US 2022/0387726 A1    Dec. 8, 2022

(30) Foreign Application Priority Data

Nov. 27, 2019 (EP) ..................................... 19211853

(51) Int. Cl.
*A61M 5/315*     (2006.01)
*A61M 5/20*      (2006.01)
*A61M 5/32*      (2006.01)

(52) U.S. Cl.
CPC .... *A61M 5/31585* (2013.01); *A61M 5/31501* (2013.01); *A61M 2005/208* (2013.01); *A61M 2005/3267* (2013.01)

(58) Field of Classification Search
CPC .... A61M 2005/2013; A61M 2005/208; A61M 2005/2073; A61M 5/3257;
(Continued)

(56) References Cited

U.S. PATENT DOCUMENTS

2005/0137571 A1* 6/2005 Hommann .......... A61M 5/3158
                                                      604/500
2013/0274676 A1* 10/2013 Ekman .............. A61M 5/31513
                                                      604/197
(Continued)

FOREIGN PATENT DOCUMENTS

CN      107206183 A     9/2017
CN      107438442 A    12/2017
(Continued)

OTHER PUBLICATIONS

International Search Report and Written Opinion for Int. App. No. PCT/EP2020/081838, mailed Nov. 27, 2020.

*Primary Examiner* — Theodore J Stigell
*Assistant Examiner* — Benjamin Koo
(74) *Attorney, Agent, or Firm* — McDonnell Boehnen Hulbert & Berghoff LLP (57) ABSTRACT

A drive assembly for a medicament delivery device having a driver rotationally driven, an actuator sleeve, and a resilient blocking member that surrounds the driver and is arranged radially inside of the actuator sleeve, wherein the blocking member engages with the driver to prevent rotation of the driver relative to the blocking member, the actuator sleeve being configured to move from a first position relative to the blocking member, in which the drive assembly is in an initial state and in which the actuator sleeve is configured to prevent the blocking member from moving radially outwards, causing the blocking member to engage with the driver and thereby prevent the driver from rotation, to a second position in which the drive assembly is in an activation state.

18 Claims, 8 Drawing Sheets

(58) Field of Classification Search
CPC ........ A61M 2005/3267; A61M 5/2033; A61M 5/31501; A61M 5/31585
See application file for complete search history.

(56) References Cited

U.S. PATENT DOCUMENTS

| | | | |
|---|---|---|---|
| 2016/0303327 A1* | 10/2016 | Moren | ................ A61M 5/2033 |
| 2017/0136189 A1 | 5/2017 | Tschirren et al. | |
| 2019/0192776 A1 | 6/2019 | Alexandersson | |
| 2019/0240409 A1 | 8/2019 | Holmqvist et al. | |

FOREIGN PATENT DOCUMENTS

| | | |
|---|---|---|
| CN | 107847675 A | 3/2018 |
| CN | 108367118 A | 8/2018 |
| CN | 109310829 A | 2/2019 |
| JP | 2013-539679 A | 10/2013 |
| JP | 2019514590 | 6/2016 |
| WO | 2012/045828 A1 | 4/2012 |
| WO | 2015/185311 A1 | 12/2015 |
| WO | 2016/033701 A1 | 3/2016 |
| WO | 2016/120180 A1 | 8/2016 |
| WO | 2018/010947 A1 | 1/2018 |
| WO | 2018236619 A1 | 12/2018 |
| WO | 2019/011689 A1 | 1/2019 |
| WO | 2019/011690 A1 | 1/2019 |
| WO | 2019/137701 A1 | 7/2019 |

\* cited by examiner

DRIVE ASSEMBLY FOR A MEDICAMENT DELIVERY DEVICE

CROSS REFERENCE TO RELATED APPLICATIONS

The present application is a U.S. National Phase Application pursuant to 35 U.S.C. § 371 of International Application No. PCT/EP2020/081838 filed Nov. 12, 2020, which claims priority to European Patent Application No. 19211853.7 filed Nov. 27, 2019. The entire disclosure contents of these applications are herewith incorporated by reference into the present application.

TECHNICAL FIELD

The present disclosure generally relates to medicament delivery devices.

BACKGROUND

Medicament delivery devices may be designed to automatically perform a medicament administration operation, i.e. to expel a drug or medicament. Such an operation may be triggered by the user when interacting with the medicament delivery device. The user may for example initiate a medicament administration operation by moving a needle cover extending from the housing into the housing or by pushing a button provided on the medicament delivery device. This movement triggers internal components to cause an automatic medicament expulsion. The medicament expulsion may for example be provided by means of one or more springs and/or by means of an internal motor. One example of medicament delivery devices of this type is auto-injectors.

WO2016/120180 discloses a piston rod drive arrangement for an injection device, which comprises a piston rod which has an outer surface provided with an outer thread and which has a non-circular cross section, a first element engaging with the piston rod and a second element with an inner thread mating with the outer thread of the piston rod. By rotation of either the first element or the second element, the piston rod may be moved linearly relative to the first element and the second element. The first element may be provided with external protrusions driven by a drive mechanism such as an electric motor or a spring motor.

US 2019/192776 A1 discloses an administration mechanism for a medicament delivery device is disclosed having a linearly displaceable medicament delivery member cover, an actuator sleeve, an actuator, wherein the medicament delivery member cover is configured to axially displace the actuator sleeve from an initial position to a distally displaced position thereby displacing the actuator sleeve relative to the actuator, a rotator having a guide structure, a plunger holder, and a plunger rod that is proximally biased. The actuator can engage with the plunger holder in the initial position of the actuator sleeve to prevent the plunger holder from proximal displacement relative to the actuator. The actuator can be released from engagement with the plunger holder by displacement of the actuator sleeve towards the distally displaced position to enable proximal displacement of the plunger holder, the plunger rod and the rotator relative to the actuator. The actuator can rotate the rotator relative to the plunger holder, releasing the plunger rod from the plunger holder.

WO 2019/011689 A1 discloses a transport assembly for shipping components of a medicament delivery device to final assembly, the transport assembly being configured to be mounted into a housing of a medicament delivery device, comprising: a plunger rod, a first resilient member configured to bias the plunger rod in the proximal direction, an elongated plunger rod holder configured to receive the plunger rod and configured to engage with the plunger rod to prevent the plunger rod from movement in the proximal direction, a transport securing sleeve configured to receive a portion of the plunger rod holder, and configured to move axially from a first position relative to the plunger rod holder in which the transport securing sleeve prevents the plunger rod holder to disengage from the plunger rod to a second position located distally relative to the first position, enabling disengagement of the plunger rod holder from the plunger rod, a rear end cap, and a second resilient member configured to bear against the rear end cap and configured to bias the transport securing sleeve in the proximal direction away from the second position.

WO 2018/010947 A1 describes an administration mechanism for a medicament delivery device, comprising: a movable sleeve, and a delivery member cover having a distal end portion configured to receive the movable sleeve, and configured to be linearly displaceable between a first position and a second position relative to the movable sleeve, wherein the distal end portion has an end face defining a guide surface and the movable sleeve has a radially outwards extending first follower structure configured to cooperate with the guide surface when the delivery member cover is moved from the first position towards the second position, causing the movable sleeve to rotate.

SUMMARY

WO2016/120180 does not disclose any solution of how to actuate the first element or the second element upon activation of the injection device.

An object of the present disclosure is to provide a medicament delivery device which solves or at least mitigates problems of the prior art.

There is hence according to a first aspect of the present disclosure provided a drive assembly for initiating medicament delivery by means of a medicament delivery device, the drive assembly comprising: a driver configured to be rotationally driven, an actuator sleeve, a resilient blocking member configured to surround the driver, and configured to be arranged radially inside of the actuator sleeve, and a delivery member cover configured to be moved linearly relative to the driver, between a first delivery member cover position and a second delivery member position, wherein the delivery member cover is configured to cause the actuator sleeve to move from the first position to the second position, wherein the blocking member is configured to engage with the driver to prevent rotation of the driver relative to the blocking member, the actuator sleeve being configured to move from a first position relative to the blocking member, in which the drive assembly is in an initial state and in which the actuator sleeve is configured to prevent the blocking member from moving radially outwards, causing the blocking member to engage with the driver and thereby prevent the driver from rotation, to a second position in which the drive assembly is in an activation state, wherein when the actuator sleeve is moved from the first position towards the second position the actuator sleeve is configured to set the blocking member free to disengage from the driver, enabling the driver to rotate and wherein the blocking member has arms extending radially inwards and the driver has radially outwards extending protrusions, wherein the arms are configured to engage with the protrusions when the actuator sleeve is in the first position.

Thus, activation of a medicament delivery device may be controlled by means of the position of the activation sleeve.

The driver may for example be spring driven or configured to be driven by an electric motor.

The drive assembly is for a medicament delivery device. The medicament delivery device may for example be an auto-injector.

According to one embodiment the blocking member is ring-shaped.

According to one embodiment the actuator sleeve is configured to prevent the arms from moving radially outwards and disengage from the driver when the actuator sleeve is in the first position.

According to one embodiment the actuator sleeve is configured to enable the arms to flex radially outwards when the actuator sleeve is in the second position.

According to one embodiment the driver is configured to provide a rotational force on the arms, urging the arms radially outwards. Thus, the arms may be configured to be pressed or urged radially outwards by the protrusions.

Alternatively, or additionally the arms may be prestressed urging to move radially outwards to their default position when the activation sleeve is moved towards the second position.

According to one embodiment in the first position of the actuator sleeve each arm has an inclined surface configured to cooperate with the radially outwards extending protrusions to urge the arms radially outwards by rotation.

The inclined surface may be inclined relative to any radial plane extending through the central axis of the driver and the blocking member and/or relative to the corresponding surface of the protrusion configured to cooperate with the inclined surface.

According to one embodiment each arm is provided with a radial inner recess or groove configured to receive a respective one of the radially outwards extending protrusions.

According to one embodiment each inner recess or groove has a sidewall which defines the inclined surface.

According to one embodiment the actuator sleeve has openings which are offset from the arms in the first position and which become aligned with a respective arm in the second position, enabling the arms to flex radially outwards.

The first delivery member cover position is also referred to as an extended position herein and the second delivery member cover position is also referred to as a retracted position herein.

According to one example, the actuator sleeve is the delivery member cover.

According to one embodiment in the first delivery member cover position the actuator sleeve is in the first position and in the second delivery member position the actuator sleeve is in the second position.

According to one embodiment the delivery member cover is configured to axially move the actuator sleeve from the first position to the second position when the delivery member cover is moved from the first delivery member cover position to the second delivery member position.

According to one embodiment the actuator sleeve is provided with a guide track configured to interact with the delivery member cover, causing linear movement of the delivery member cover to be transformed to rotational movement of the actuator sleeve, wherein the first position is a first rotational position and the second position is a second rotational position.

One embodiment comprises a plunger rod, wherein the driver is configured to receive the plunger rod.

Typically, axial movement of a plunger rod may be triggered by the rotation of the driver. Rotation of the driver causes or contributes to axial movement of the plunger rod.

The plunger rod may be provided with an external thread structure and the driver may be provided with an internal thread structure threadedly engaged with the external thread structure, enabling forward movement of the plunger rod when the driver is rotated.

There is according to a second aspect of the present disclosure provided a medicament delivery device comprising the drive assembly as claimed in any of the preceding claims.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
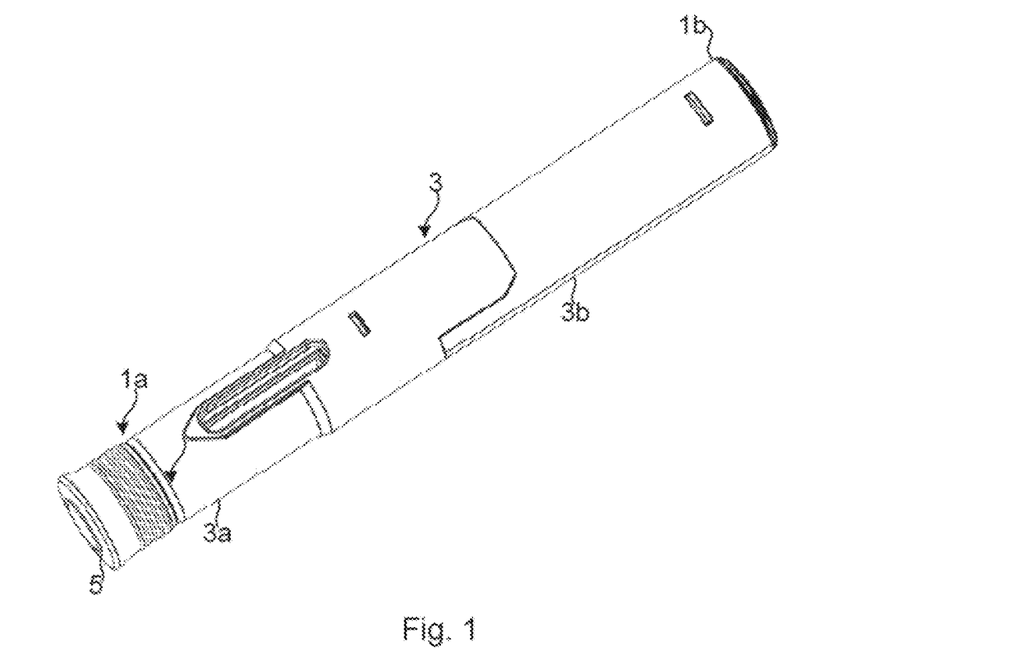
FIG. 1 is a perspective view of one example of a medicament delivery device.

FIG. 1 shows an example of a medicament delivery device 1. The medicament delivery device 1 includes a housing 3. The housing 3 forms an elongated structure. The housing 3 includes a front housing part 3a and a rear housing part 3b. The housing 3 could alternatively be formed by a single housing part of by more than two housing parts.

The medicament delivery device 1 includes a removable cap 5. The cap 5 forms part of a front end 1a of the medicament delivery device 1. The medicament delivery device 1 has a rear end 1b opposite to the front end 1a.

Figure 2:
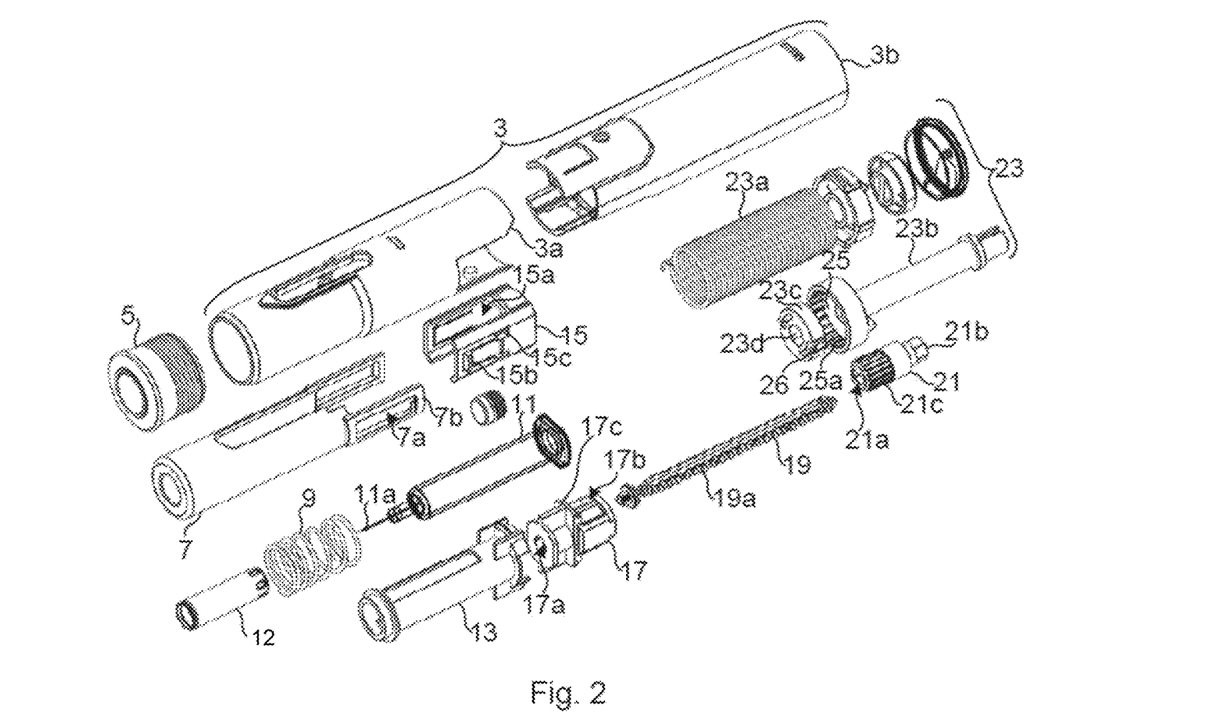
FIG. 2 is an exploded view of the medicament delivery device in FIG. 1.

FIG. 2 shows an exploded view of the medicament delivery device 1. The medicament delivery device 1 comprises an elongated delivery member cover 7 configured to be received by the housing 3. The delivery member cover 7 is configured to be moved between an extended position relative to the housing 3 and a retracted position. The delivery member cover 7 is configured to be biased towards the extended position. When the cap 5 has been removed, the delivery member cover 7 is arranged in the extended position. The medicament delivery device 1 comprises a first resilient member 9 configured to bias the delivery member cover 7 towards the extended position. The first resilient member 9 may for example be a spring such as a helical spring.

The medicament delivery device 1 comprises a medicament container 11 provided with a delivery member 11a such as a needle, and a medicament container holder 13 configured to receive the medicament container 11.

The medicament delivery device 1 may comprise a delivery member shield 12 configured to protect the delivery member 11 a. The delivery member shield 12 may engage with the cap 5 such that the delivery member shield 12 is removed from the delivery member 11 a together with the cap 5 when the cap 5 is removed.

The medicament delivery device 1 comprises an actuation sleeve 15 configured to engage with the delivery member cover 7. The actuation sleeve 15 is configured to be actuated by the delivery member cover 7 such that when the delivery member cover 7 is moved from the extended position, the actuation sleeve 15 is moved from a first position in which the medicament delivery device 1 is in an initial state, towards a second position in which the medicament delivery member is in an activation state. The initial state is a pre-activation state of the medicament delivery device 1.

The delivery member cover 7 is provided with axially extending slots 7a. The actuator sleeve 15 has front stop structures 15b and rear stop structures 15c. Each front stop structure 15b is configured to run in a respective slot 7a. Each slot 7a has a rear end wall 7b which is configured to move between the corresponding front stop structure 15b and rear stop structure 15c. The delivery member cover 7 is hence configured to move the actuator sleeve 15 from the first position towards the second position when the rear end wall 7b engages with the rear stop structure 15c. The delivery member cover 7 is hence able to move axially relative to the actuator sleeve 15 when the rear end wall 7b is positioned between the front stop structure 15b and the rear stop structure 15c.

As an alternative to the actuation sleeve 15 and the delivery member cover 7 being made as separate components, the actuation sleeve and the delivery member cover could form a single integrated component.

The medicament delivery device 1 comprises a resilient blocking member 17, a plunger rod 19, a driver 21 and a power pack assembly 23. The blocking member 17, the plunger rod 19, the driver 21 and the actuator sleeve 15 form a drive assembly for initiating a medicament delivery or medicament delivery operation of the medicament delivery device 1.

The blocking member 17 has a central opening 17a configured to receive the plunger rod 19. The plunger rod 19 has an external surface provided with a plurality of external threads 19a. The plunger rod 19 may have a non-circular cross section. The plunger rod 19 may have a non-circular cross-sectional shape along its entire length or along at least a majority of its length. The driver 21 has an opening 21a configured to receive the plunger rod 19. The opening 21a may have a non-circular cross-section. The opening 21a may for example be adapted to match the cross-sectional shape of the plunger rod 19.

The driver 21 is configured to be connected to the power pack assembly 23. The driver 21 is configured to be rotated by the power pack assembly 23. The power pack assembly 23 comprises a rotation device 23a. The rotation device 23a is in the present example a torsion spring but could for example alternatively be a motor. The power pack 23 comprises a rotator rod 23b which is configured to be rotated by the rotation device 23a. In the present example, the rotation device 23a is configured to torsionally bias the rotator rod 23b. The power pack assembly 23 also comprises an insert member 23c configured to engage with the rotator rod 23b. The rotator rod 23b has a front opening 25 provided with a plurality of radially inwards extending teeth 25a. The insert member 23c is configured to be received in the front opening 25. The insert member 23c has radially outwards extending ratchet arms 26 configured to engage with the teeth 25a. The insert member 23c is thereby able to rotate in a first direction and prevented from rotating in a second direction opposite to the first direction.

The driver 21 has a rear end portion 21b with a non-circular cross-sectional shape. The insert member 23c has a driver opening 23d configured to receive the rear end portion 21b of the driver 21. The driver opening 23d has a non-circular cross-sectional shape which matches the non-circular cross-sectional shape of the rear end portion 21b of the driver 21. The rear end portion 21b is hence configured to engage with the inner surface of the driver opening 23d. Rotation of the rotator rod 23b is hence transferred to the driver 21.

The driver 21 is provided with a plurality of radially outwards extending protrusions 21c. The blocking member 17 comprises arms 17b configured to engage with the protrusions 21c. Rotation of the driver 21 can thereby be prevented. Thus, rotation of the rotator rod 23b is prevented as long as the arms 17b engage with the protrusions 21c.

The blocking member 17 is configured to be rotationally locked relative to the housing 3. In the present example, the blocking member 17 is provided with engagement ribs 17c extending radially outwards, configured to engage with an inner structure of the housing 3 to prevent rotation of the blocking member 17 relative to the housing 3.

The actuator sleeve 15 is in the first position arranged axially relative to the blocking member 17 such that the arms 17*b* are held in engagement with the protrusions 21*c*. The actuator sleeve 15 hence prevents the arms 17*b* from moving radially outwards and disengage from their engagement with the protrusions 21*c*. The actuator sleeve 15 has an opening 15*a* which axially aligns with the arms 17*b* when the actuator sleeve 15 is moved towards the second position. The arms 17*b* are thereby able to move radially outwards from their engagement with the protrusions 21*c*. The driver 21 is thereby set free to rotate relative to the blocking member 17. The plunger rod 19 which has matching cross-sectional shape with the opening 21*a* will therefore rotate concurrently with the driver 21. The central opening 17*a* of the blocking member 17 is circular and provided with an internal thread configured to cooperate with the external threads 19*a* of the plunger rod 19. This causes the plunger rod 19 to move forward through the blocking member 17 and to slide through the opening 21*a* of the driver 21. The plunger rod 19 is thereby moved forward inside the medicament container 11. The plunger rod 19 is provided with a stopper 10 arranged in the medicament container 11.

Figure 3:
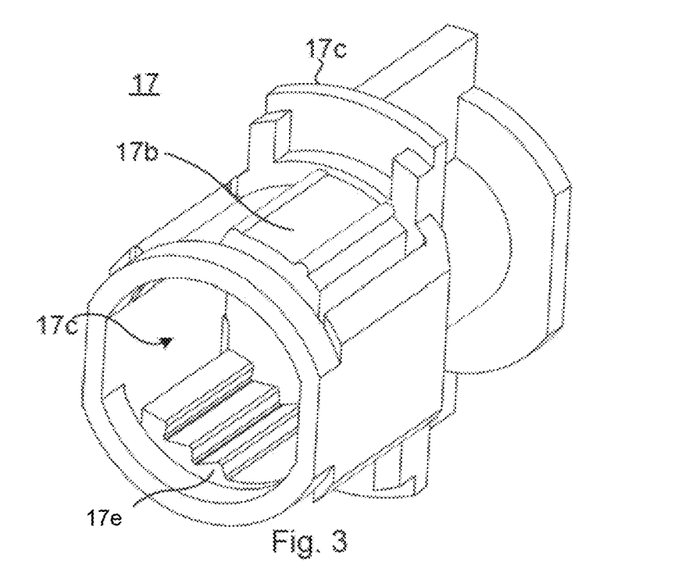
FIG. 3 is a close-up perspective view of a blocking member.

FIG. 3 shows a rear view of the blocking member 17. The blocking member 17 is configured to receive a front portion of the driver 21. The blocking member 17 has a rear channel portion 17 *c* configured to receive the front portion of the driver 21. The front portion of the driver 21 comprises the protrusions 21 *c*. The rear channel portion 17 *c* is formed between the arms 17 *b*. The arms 17 *b* are provided with radially inwards extending structures 17 *e* configured to engage with the protrusions 21C.

Figure 4:
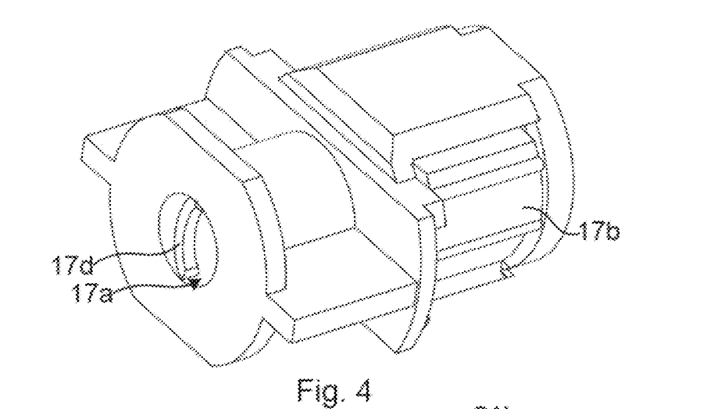
FIG. 4 is a close-up view perspective view of the blocking member in FIG. 3.

FIG. 4 shows a view of the blocking member 17 opposite to the one shown in FIG. 3. The internal thread 17*d* of the central opening 17*a* configured to engage with the external threads 19*a* of the plunger rod 19 is here shown.

Figure 5:
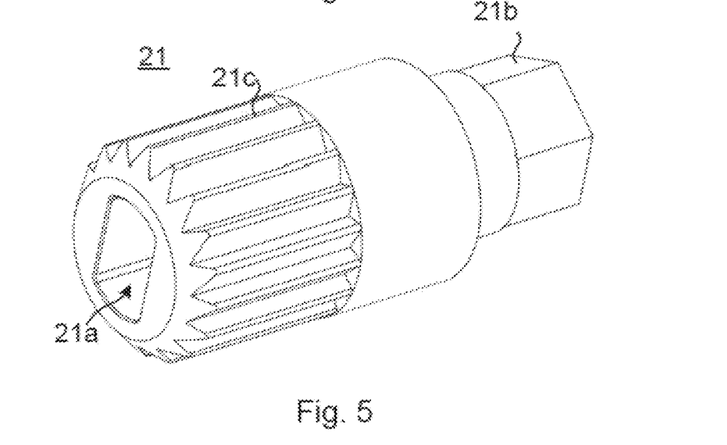
FIG. 5 is a close-up perspective view of a driver.

FIG. 5 shows a close-up view of the driver 21. The protrusions 21*c* are in the example in the form of a plurality of tapering teeth arranged circumferentially around the driver 21. The rear end portion 21*b* has in this example a polygonal cross-sectional shape, but could for example instead have a rectangular, oval or elliptical shape.

Figure 6:
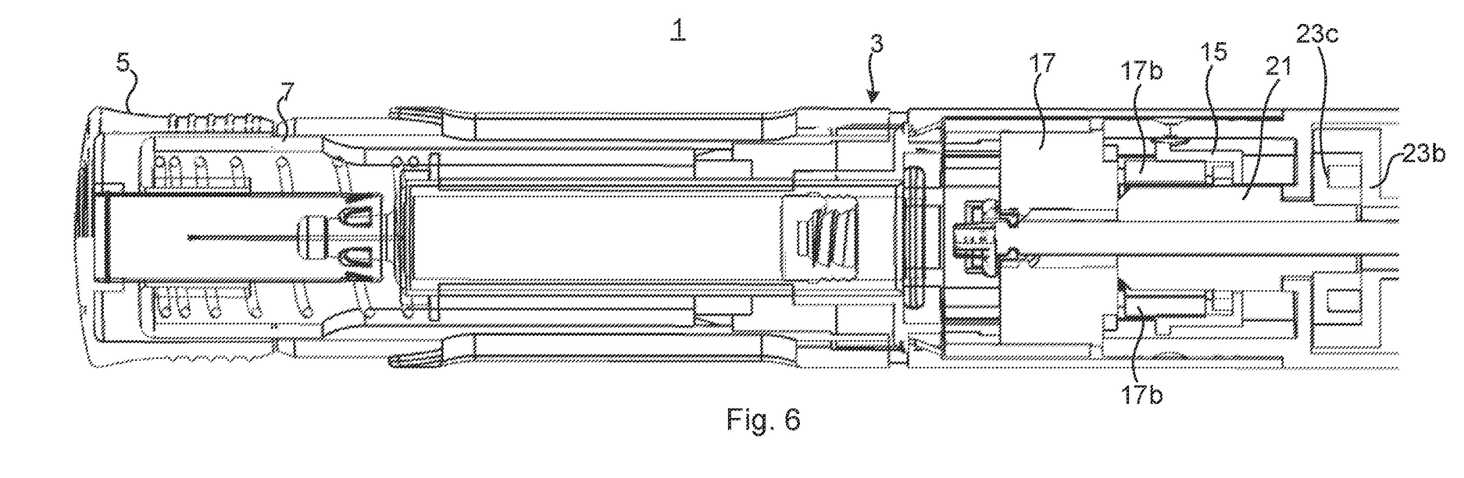
FIG. 6 is a longitudinal sectional view of a front portion of the medicament delivery device in FIG. 1 in an initial state.

FIG. 6 shows a portion of a longitudinal section of the medicament delivery device 1 in an initial state. In the initial state of the medicament delivery device 1 the drive assembly is also in an initial state. The cap 5 is arranged on the delivery member cover 7. The arms 17*b* of the blocking member 17 are in engagement with the protrusions 21*c* of the driver 21. This prevents rotation of the driver 21, which is torsionally biased by the power pack assembly 23.

When a medicament administration operation is to be performed, the user will remove the cap 5 from the delivery member cover 7. The user will then place the front end of the delivery member cover 7 towards the injection site. As the user pushes the medicament delivery device 1 towards the site of injection, the delivery member cover 7 is moved into the housing 3 from the extended position towards the retracted position.

Figure 7:
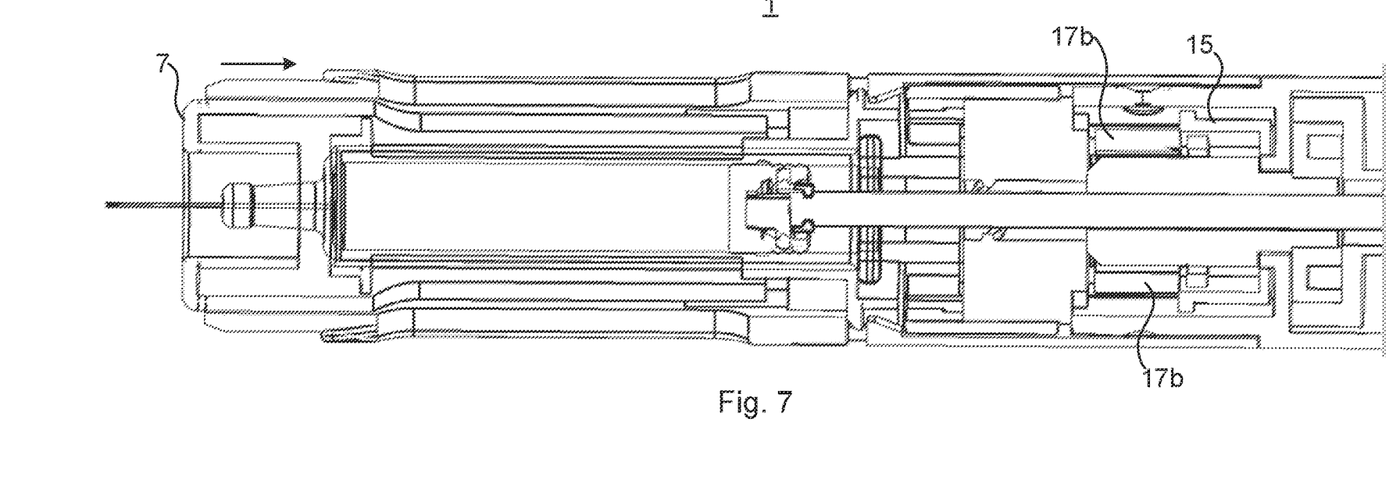
FIG. 7 is a longitudinal sectional view of a front portion of the medicament delivery device in FIG. 1 when it is being activated.

In FIG. 7, the medicament delivery device 1 is shown in a state prior to an activation state but after the initial state shown in FIG. 6. In the state shown in FIG. 7, the delivery member cover 7 has been moved towards the rear end 1*b* of the medicament delivery device 1, i.e. towards the retracted position. The delivery member cover 7 has also moved the actuator sleeve 15 from the first position almost to the second position. In FIG. 7 the arms 17*b* are hence almost set free, i.e. they are almost aligned with the opening 15*a* of the actuator sleeve 15.

Figure 8:
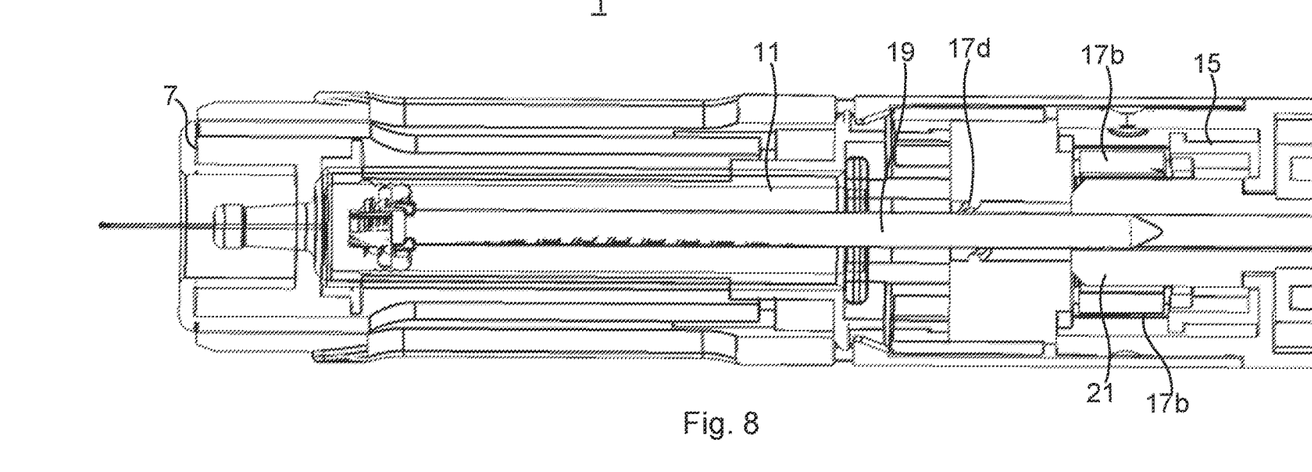
FIG. 8 shows a longitudinal sectional view of the medicament delivery device in FIG. 1 in an activation state.

In FIG. 8 the medicament delivery device 1 is in the activation state. In the activation state of the medicament delivery device 1 the drive assembly is also in the activation state. The activation state is a state in which the plunger rod 19 has been set to move forward further into the medicament container 11. The delivery member cover 7 has been moved fully to the retracted position and the activation sleeve 15 has been moved to the second position. The arms 17*b* have hence aligned with the opening 15*a* and are able to move radially outwards to disengage from the protrusions 21*c*. The arms 17*b* may for example be urged radially outwards by the protrusions 21*c* which provide a rotating force onto the arms 17*b*. Alternatively or additionally, the arms 17*b* may be arranged in a pretensioned state when the actuation sleeve 15 bears against the arms 17*b* and they may strive for flexing radially outwards to obtain their unstressed default positions.

As the driver 21 is set in rotation the plunger rod 19 is also set in rotation concurrently with the driver 21. The internal thread 17*d* will cooperate with the externa threads 19*a* of the plunger rod 19 causing the plunger rod to move forward through the blocking member 17. The plunger rod 19 is hence slid forward relative to the driver 21 in which the plunger rod 19 extends. The plunger rod 19 is thus moved in the forward direction further into the medicament container 11. Medicament is thereby expelled from the medicament container 11.

Figure 9:
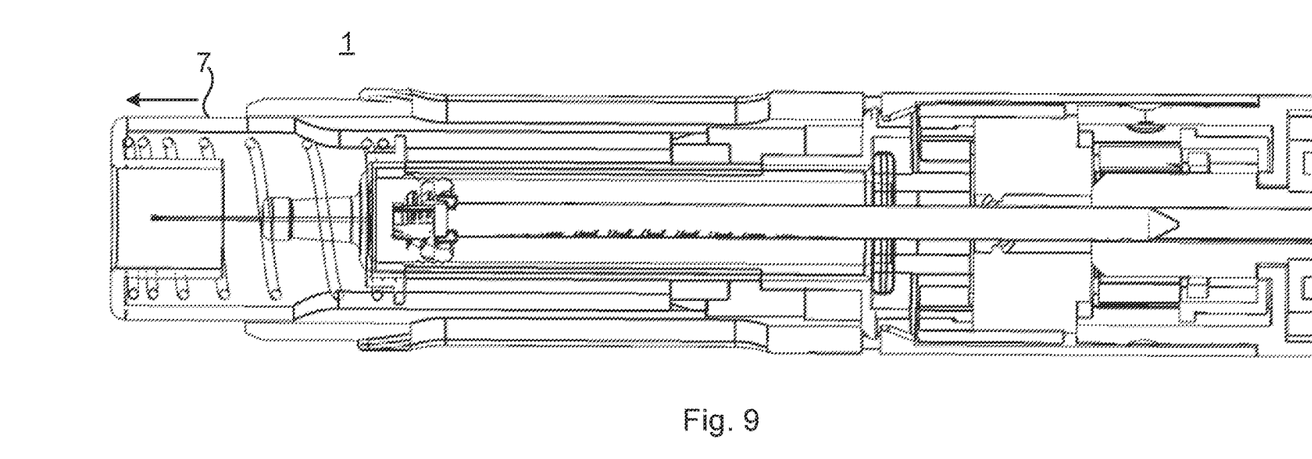
FIG. 9 shows a longitudinal sectional view of the medicament delivery device in FIG. 1 after medicament expulsion.

FIG. 9 shows when the delivery member cover 7 is released from being pushed into the housing 3. The delivery member cover 7 is thereby moved from the retracted position towards the extended position. This situation typically occurs when the medicament has been injected and the medicament delivery device 1 is removed from the injection site.

Figure 10:
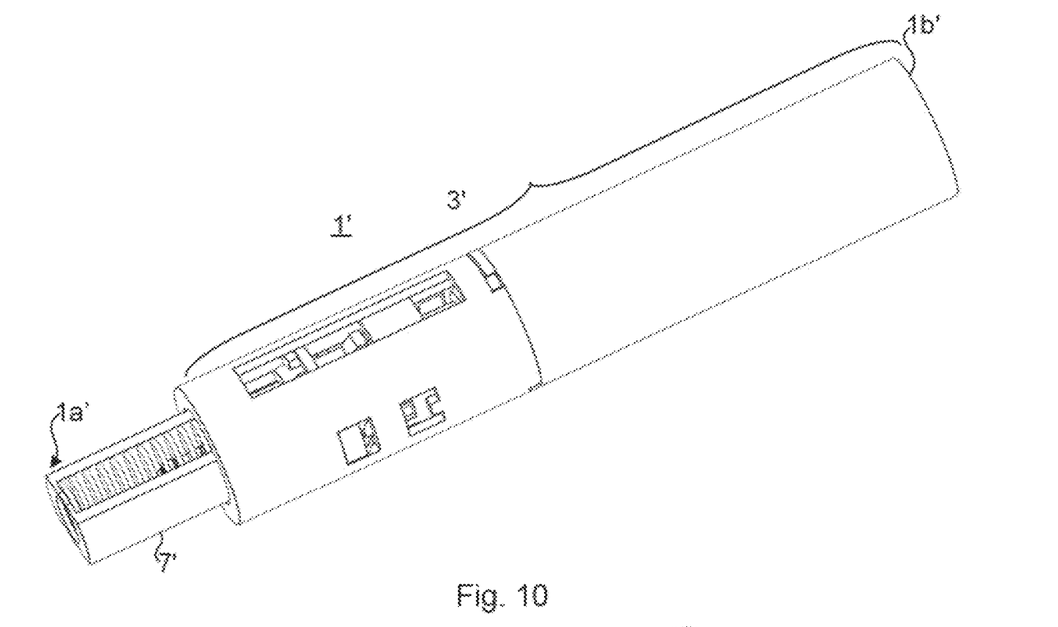
FIG. 10 is a perspective view of another example of a medicament delivery device.

FIG. 10 schematically shows another example of a medicament delivery device 1'. The medicament delivery device 1' has a housing 3' and a front end 1*a'* and a rear end 1*b'*. The medicament delivery device 1' could optionally include an external housing enclosing the housing 3 shown in FIG. 10. The medicament delivery device 1' comprises a delivery member cover 7' movable between an extended position relative to the housing 3', shown in FIG. 10, and a retracted position.

Figure 11:
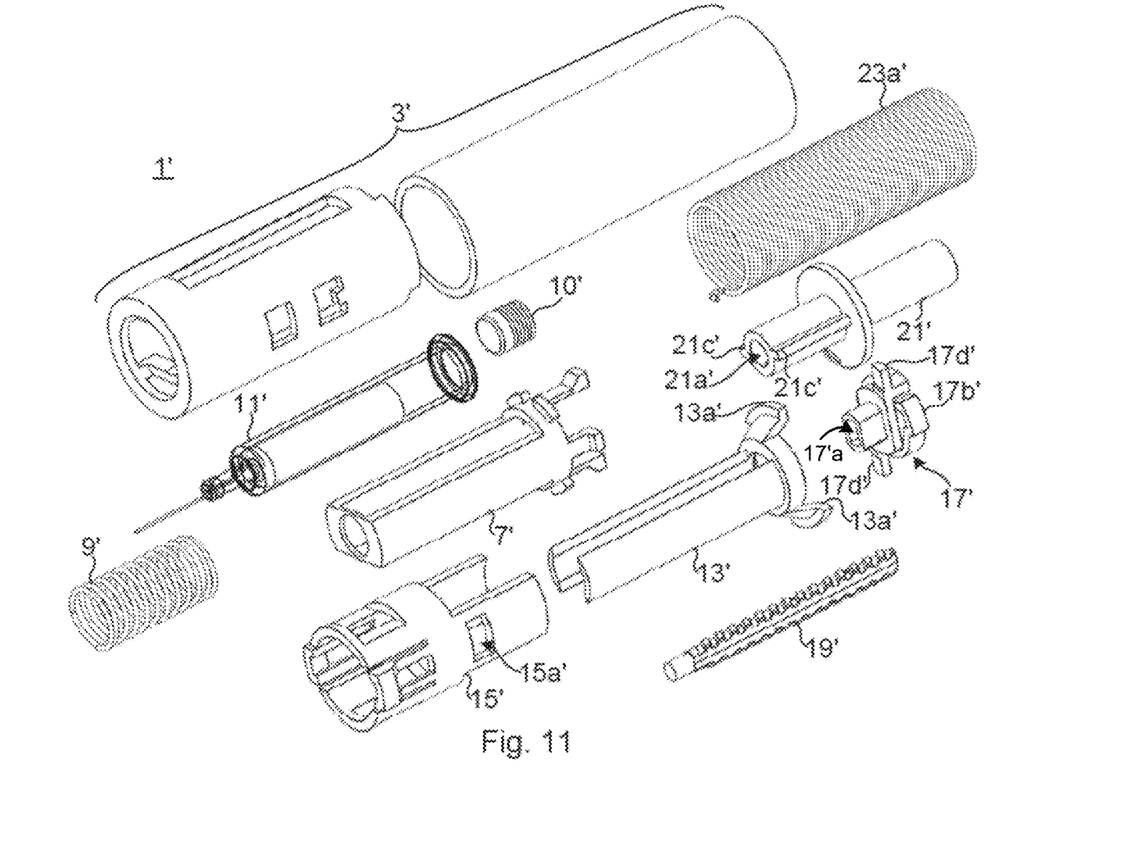
FIG. 11 is an exploded view of the medicament delivery device in FIG. 10.

FIG. 11 shows an exploded view of the medicament delivery device 1'. Many of the components are similar to and have similar function as for the medicament delivery device 1. For example, the medicament delivery device 1' comprises a resilient member 9' such as a spring, configured to bias the delivery member cover 7' towards the extended position, a medicament container 11', a medicament container holder 13', a stopper 10', a rotation device 23*a'*, a resilient blocking member 17', an actuator sleeve 15' configured to be moved axially relative to the housing 3' from a first position to a second position, a plunger rod 19' provided with external threads 19*a'* and a driver 21'. The blocking member 17' is ring-shaped.

The blocking member 17' is configured to be rotationally locked relative to the housing 3'. In the present example, the blocking member 17' has radially outwards extending structures 17*d'* configured to bear against radial structures 13*a'* of the medicament container holder 13'. The radial structures 13'*a* are configured to be received in recesses or openings of the housing 3'. The medicament container holder 13' is thereby configured to be rotationally locked relative to the housing 3'.

The actuator sleeve 15' is configured to engage with the delivery member cover 7'. The delivery member cover 7' is configured to actuate the actuator sleeve 15' such that when the delivery member cover 7' is moved from the extended position to the retracted position the actuator sleeve 15' is configured to move from the first position to the second position. Just like in the first example, the delivery member cover 7' is able to move a limited amount axially relative to the actuator sleeve 15'.

According to one variation, the actuator sleeve and the delivery member cover may be integrated and form a single component.

The actuator sleeve 15' is provided with an opening 15 a'. The blocking member 17' is configured to receive the plunger rod 19'. The plunger rod 19' has a non-circular cross-sectional shape. The blocking member 17' has a central opening 17 a' extending axially through the blocking member 17'. The central opening 17 a' has a non-circular cross-sectional shape that matches the non-circular cross-sectional shape of the plunger rod 19'. The blocking member 17' and the plunger rod 19' are hence rotationally locked relative to each other.

The blocking member 17' is provided with radially outwards extending arms 17b'.

The driver 21' has an opening 21 a' configured to receive a portion of the plunger rod 19'. The opening 21'a has a circular cross-sectional shape. The opening 21'a has an inner surface provided with an internal thread configured to cooperate with the external threads of the plunger rod 19'. The driver 21' has radially outwards extending protrusions 21 c'. The protrusions 21 c' are configured cooperate with the arms 17 b' of the blocking member 17'. The protrusions 21'c may be offset from a central longitudinally extending plane intersecting the central axis of the driver 21'. One of the protrusions 17 b' may be arranged on one side of such a plane and the other protrusion 17 b' may be arranged at another side of the plane. This may facilitate pushing the arms 17 b' radially outwards when they are set to move freely as the actuator sleeve 15' attains its second position. In the present example, the driver 21' has exactly two protrusions 21 c' but could alternatively have more than two protrusions. The rotation device 23 a' is in this example a torsion spring but could alternatively for example be a motor. The rotation device 23'a is configured to torsionally bias the driver 21'.

Figure 12:
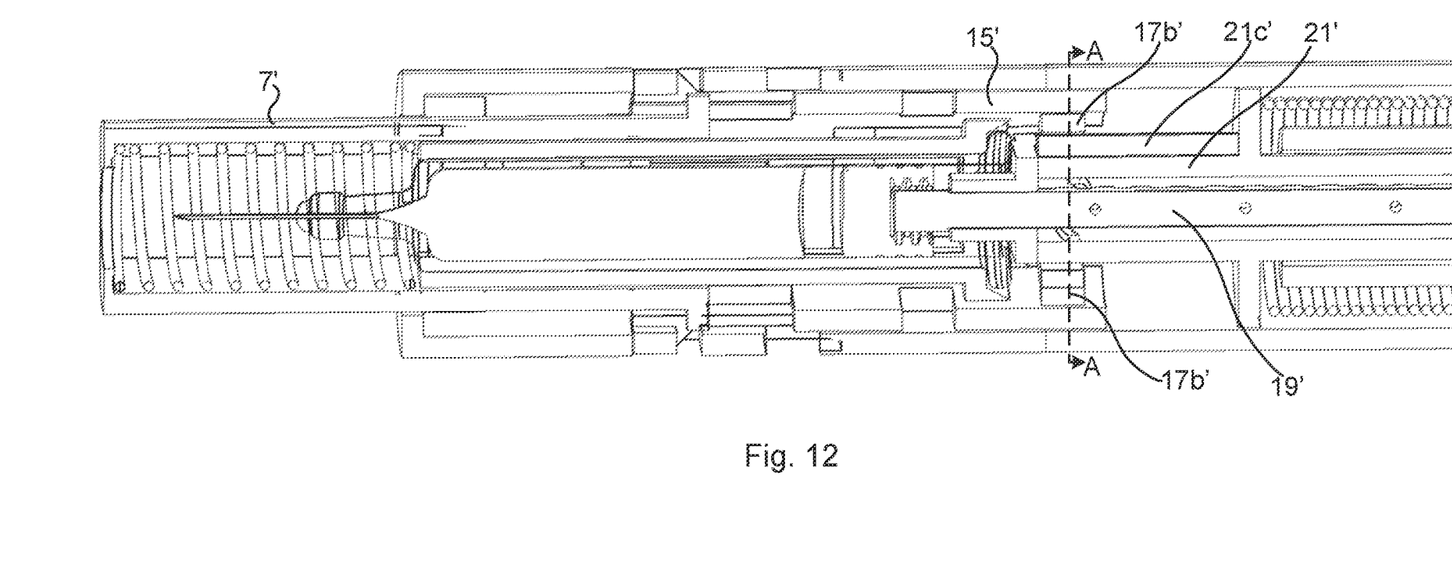
FIG. 12 is a longitudinal sectional view of the medicament delivery device in FIG. 10 in an initial state.

FIG. 12 shows the medicament delivery device 1' in an initial state. The delivery member cover 7' is in this case in the extended position and the actuator sleeve 15' is in the first position. The actuator sleeve 15' hence bears against the arms 17b' which are thereby unable to move radially outwards. The arms 17b' engage with the protrusions 21c'. The driver 21' is thus prevented from rotating.

Figure 13:
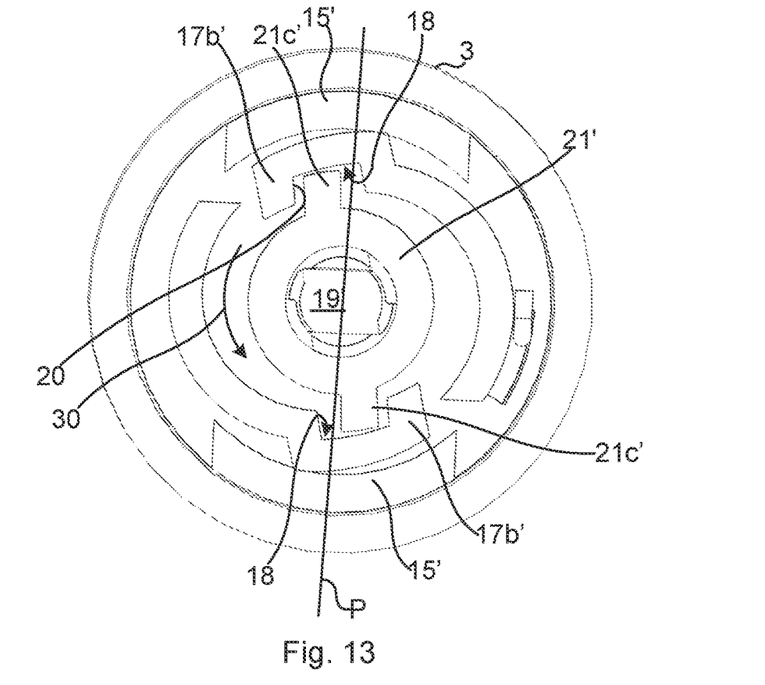
FIG. 13 is a cross-sectional view of the medicament delivery device in FIG. 12 along lines A-A.

FIG. 13 shows a cross-section of the medicament delivery device 1' along lines A-A shown in FIG. 12. A longitudinal plane P is here shown, which intersects a central axis of the driver 21'. The two protrusions 21c' are arranged offset relative to the plane P. Each arm 17b' is provided with a radial inner recess or groove 18 configured to receive a respective one of the protrusions 21c'. Each inner recess 18 transitions into or has as its sidewall an inclined surface 20 configured to cooperate with the corresponding protrusion 21c' to facilitate radial outward flexing of the arms 17b' by means of the protrusions 21c' when the actuator sleeve 15' is moved to the second position. The inclined surfaces 20 facilitate for the protrusions 21c' to push the arms radially outwards, since the inclined surfaces create an expanding force on the arms 17b' and a steep angle of each inclined surface 20 makes the expanding force lower than a direct force from the driver. The driver 21'c is torsionally biased to rotate in a first direction as indicated by the arrow 30.

Figure 14:
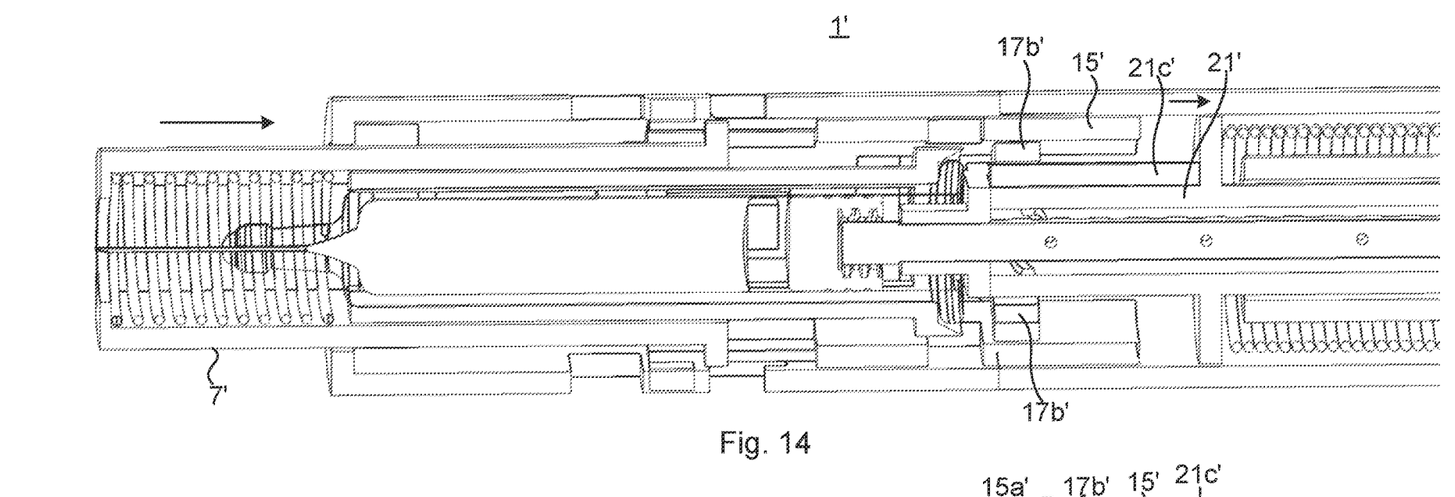
FIG. 14 is a longitudinal sectional view of the medicament delivery device in FIG. 10 as the medicament delivery device is about to be activated.

FIG. 14 shows the medicament delivery device 1' when the delivery member cover 7' is moved from the extended position towards the retracted position. This movement of the delivery member cover 7' causes movement of the actuator sleeve 15' from the first position towards the second position. The actuator sleeve 15' is in the state shown in FIG. 14 still bearing against the arms 17b', causing them to engage with the protrusions 21c'. The driver 21' is hence still rotationally locked by the blocking member 17'.

Figure 15:
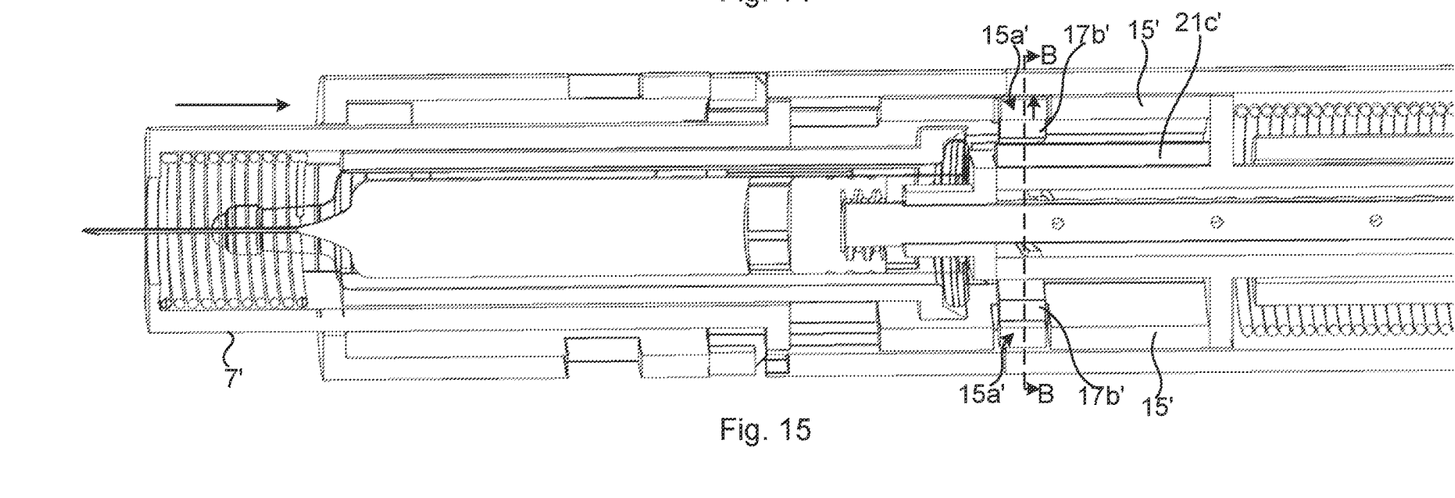
FIG. 15 is a longitudinal sectional view of the medicament delivery device in FIG. 10 when the medicament delivery device has attained its activation state.

FIG. 15 depicts the medicament delivery device 1' when it has attained an activation state. In the activation state, the delivery member cover 7' has moved further rearwards as shown by the arrow 32. The actuator sleeve 15' has attained its second position in which the openings 15a' have become axially aligned with the arms 17b'. The arms 17b' are thereby able to move radially outwards as shown by the arrows. The arms 17b' hence disengage from the protrusions 21c'. The torsionally biased driver 21c' will as a result rotate.

Figure 16:
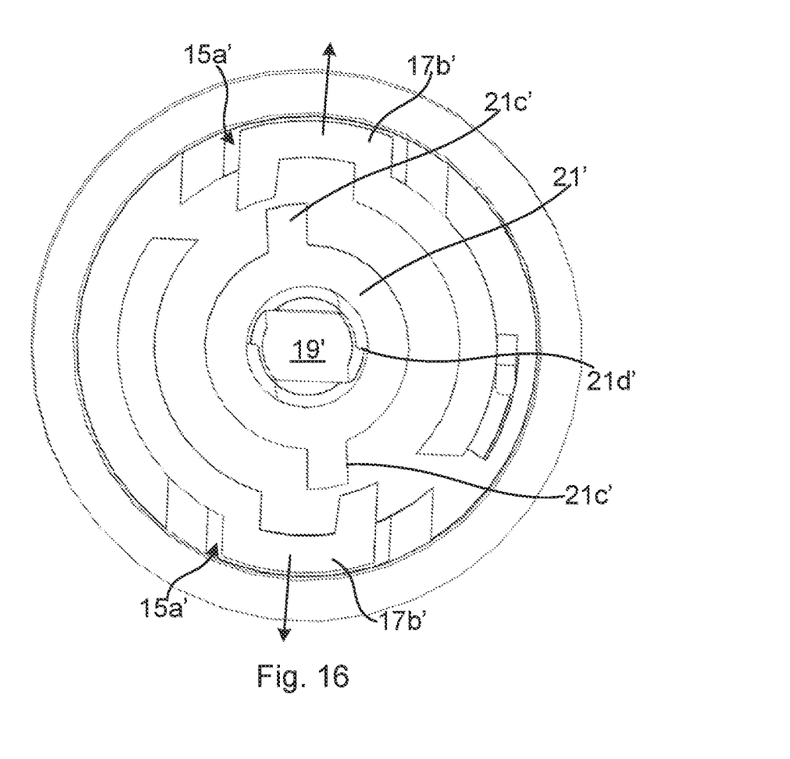
FIG. 16 is a cross-sectional view of the medicament delivery device in FIG. 15 along lines B-B.

FIG. 16 shows a cross-section along lines B-B. The arms 17b' have been moved radially outwards into the openings 15a', allowing the driver 21' to rotate. The internal thread 21d' in the opening 21a' engages with the external threads 19a' of the plunger rod 19'. The plunger rod 19' also extends through the central opening 17'a of the blocking member 17', which has a non-circular cross-sectional shape matching that of the plunger rod 19'. This causes the plunger rod 19' to slide forward through the central opening 17a' and further into the medicament container 11' as the driver 21' rotates. Medicament is thereby expelled from the medicament container 11'.

In some of the examples disclosed herein, the activation sleeve could be provided in the form of a rotator, which is configured to rotate when the delivery member cover is moved from the extended position towards the retracted position. The first position is in this case a first rotational position and the second position is a second rotational position. The activation sleeve may thus be provided with openings that align with the arms when the activation sleeve is rotated towards the second position.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A drive assembly for initiating medicament delivery by means of a medicament delivery device, the drive assembly comprising:
   a driver configured to be rotationally driven,
   an actuator sleeve,
   a delivery member cover configured to be moved linearly relative to the driver, between a first delivery member cover position and a second delivery member position, wherein the delivery member cover is configured to cause the actuator sleeve to move from a first position to a second position,
   and a resilient blocking member configured to surround the driver, and configured to be arranged radially inside of the actuator sleeve, wherein the blocking member is configured to engage with the driver to prevent rotation of the driver relative to the blocking member, the actuator sleeve being configured to move from the first position relative to the blocking member, in which the drive assembly is in an initial state and in which the actuator sleeve is configured to prevent the blocking member from moving radially outwards, causing the blocking member to engage with the driver and thereby prevent the driver from rotation, to the second position in which the drive assembly is in an activation state, wherein when the actuator sleeve is moved from the first position towards the second position the actuator sleeve is configured to set the blocking member free to disengage from the driver, enabling the driver to rotate, and wherein the blocking member has arms extending radially inwards and the driver has radially outwards extending protrusions, wherein the arms are configured to engage with the protrusions when the actuator sleeve is in the first position.

2. The drive assembly as claimed in claim 1, wherein the blocking member is ring-shaped.

3. The drive assembly as claimed in claim 1, wherein the actuator sleeve is configured to prevent the arms from moving radially outwards and disengage from the driver when the actuator sleeve is in the first position.

4. The drive assembly as claimed in claim 3, wherein the actuator sleeve is configured to enable the arms to flex radially outwards when the actuator sleeve is in the second position.

5. The drive assembly as claimed in claim 2, wherein the driver is configured to provide a rotational force on the arms, urging the arms radially outwards.

6. The drive assembly as claimed in claim 5, wherein in the first position of the actuator sleeve each arm has an inclined surface configured to cooperate with the radially outwards extending protrusions to urge the arms radially outwards by rotation.

7. The drive assembly as claimed in claim 6, wherein each arm is provided with a radial inner recess or groove configured to receive a respective one of the radially outwards extending protrusions.

8. The drive assembly as claimed in claim 7, wherein each inner recess or groove has a sidewall which defines the inclined surface.

9. The drive assembly as claimed in claim 1, wherein the actuator sleeve has openings which are offset from the arms in the first position and which become aligned with a respective arm in the second position, enabling the arms to flex radially outwards.

10. The drive assembly as claimed in claim 1, wherein in the first delivery member cover position the actuator sleeve is in the first position and in the second delivery member position the actuator sleeve is in the second position.

11. The drive assembly as claimed in claim 1, wherein the delivery member cover is configured to axially move the actuator sleeve from the first position to the second position when the delivery member cover is moved from the first delivery member cover position to the second delivery member position.

12. The drive assembly as claimed claim 1, comprising a plunger rod, wherein the driver is configured to receive the plunger rod.

13. The drive assembly as claimed in claim 12, wherein an axial movement of the plunger rod is triggered by the rotation of the driver, wherein the rotation of the driver contributes to the axial movement of the plunger rod.

14. A medicament delivery device comprising the drive assembly as claimed in claim 1.

15. A drive assembly for use in a medicament delivery device, the drive assembly comprising:
a driver that rotates during medicament delivery;
an actuator sleeve axially movable in a proximal direction;
a delivery member cover movable relative to the driver between a first delivery member cover position and a second delivery member position, where movement of the delivery member cover in a proximal direction causes the actuator sleeve to move proximally from a first position to a second position; and
a resilient blocking member surrounding the driver and positioned radially inside of the actuator sleeve,
wherein the blocking member is operatively and releasably engaged with the driver to prevent rotation of the driver relative to the blocking member,
wherein when the actuator sleeve is in the first position the drive assembly is in an initial state and the actuator sleeve prevents an arm on the blocking member from moving radially outwards and disengaging from the driver to prevent rotation of the driver,
wherein when the actuator sleeve moves to the second position, the drive assembly is in an activation state and the actuator sleeve has moved from the first position towards the second position such that the arm disengage from the driver so that the driver rotates, and
wherein when the actuator sleeve is in the first position, the arm extends radially inward to engage radially outwards extending protrusions on the driver.

16. The drive assembly as claimed in claim 15, wherein the driver exerts a rotational force on the arm such that the arm is urged radially outward.

17. The drive assembly as claimed in claim 15, wherein the blocking member further comprises two arms, where each arm has an inclined surface that cooperates with radially outward extending protrusions on the driver that urge the arms radially outwards as the driver rotates.

18. The drive assembly as claimed in claim 17, wherein the actuator sleeve has openings which are offset from the arms in the first position, and which become aligned with the arms in the second position to allow the arms to flex radially outwards.

* * * * *